United States Patent [19]

Ogoe et al.

[11] Patent Number: 5,525,651

[45] Date of Patent: Jun. 11, 1996

[54] BLENDS OF POLYCARBONATE AND CHLORINATED POLYETHYLENE

[75] Inventors: Samuel A. Ogoe, Missouri City, Tex.; David W. Liou, Baton Rouge, La.; Oliver C. Ainsworth, Baton Rouge, La.; James R. Bethea, Baton Rouge, La.; David R. Flores, Lake Jackson, Tex.; Stephen R. Ellebracht, Lake Jackson, Tex.; John W. Muskopf, Lake Jackson, Tex.; Craig L. Werling, Lake Jackson, Tex.; Edwin J. Wilson, Midland, Mich.; John W. Cocup, Flowery Branch, Ga.; Joseph L. Allison, Baton Rouge, La.

[73] Assignee: The Dow Chemical Company, Midland, Mich.

[21] Appl. No.: 463,138

[22] Filed: Jun. 5, 1995

Related U.S. Application Data

[62] Division of Ser. No. 139,368, Oct. 20, 1993, Pat. No. 5,424,341.

[51] Int. Cl.⁶ .............. C08L 69/00; C08L 23/28; C08L 63/02

[52] U.S. Cl. .......... 523/436; 523/437; 523/460; 524/409; 524/411; 525/65; 525/67; 525/108; 525/109; 525/115; 525/146

[58] Field of Search .............. 523/436, 437, 523/460; 524/409, 411; 525/65, 67, 108, 109, 115, 146

[56] References Cited

U.S. PATENT DOCUMENTS

| | | |
|---|---|---|
| 3,442,977 | 5/1969 | Grabowski . |
| 3,597,498 | 8/1971 | Christensen . |
| 3,809,667 | 5/1974 | Coaker et al. . |
| 3,882,191 | 5/1975 | Balatoni et al. . |
| 3,956,422 | 5/1976 | Takahashi et al. . |
| 3,970,718 | 7/1976 | Takahashi et al. . |
| 4,150,066 | 4/1979 | Kudo et al. . |
| 4,239,861 | 12/1980 | Braese et al. ............... 525/146 |
| 4,429,076 | 1/1984 | Saito et al. ............... 525/57 |
| 4,430,477 | 2/1984 | Kunimune ............... 525/70 |
| 4,444,950 | 4/1984 | Sakano et al. ............... 325/67 |
| 4,499,237 | 2/1985 | Tacke et al. ............... 525/67 |
| 4,504,623 | 3/1985 | Heuschen et al. ............... 525/67 |
| 4,504,624 | 3/1985 | Heuschen et al. ............... 525/67 |
| 4,507,434 | 3/1985 | Ranade et al. ............... 525/67 |
| 4,532,282 | 7/1985 | Liu et al. ............... 525/157 |
| 4,537,933 | 8/1985 | Walker et al. ............... 525/71 |
| 4,564,653 | 1/1986 | Kamata et al. ............... 525/67 |
| 4,587,297 | 5/1986 | Walker et al. ............... 525/64 |
| 4,680,343 | 7/1987 | Lee . |
| 4,743,654 | 5/1988 | Kyu et al. ............... 525/148 |
| 4,748,195 | 5/1988 | Hackl et al. ............... 523/445 |
| 4,839,410 | 6/1989 | Atomori et al. ............... 524/281 |
| 4,885,355 | 8/1989 | Hirai et al. ............... 525/64 |
| 4,906,696 | 3/1990 | Fischer et al. ............... 525/148 |
| 4,957,974 | 9/1990 | Ilenda et al. ............... 525/301 |
| 5,030,681 | 7/1991 | Asato et al. ............... 524/504 |
| 5,109,051 | 4/1992 | Kroenke et al. ............... 524/444 |
| 5,112,909 | 5/1992 | Zimmerman ............... 525/67 |
| 5,175,204 | 12/1992 | Orikasa et al. ............... 524/504 |
| 5,219,936 | 6/1993 | Honkomp ............... 525/67 |
| 5,250,590 | 10/1993 | Nakai ............... 525/435 |
| 5,290,855 | 3/1994 | Kodama et al. ............... 525/64 |

FOREIGN PATENT DOCUMENTS

| | | |
|---|---|---|
| 0396149 | 11/1990 | European Pat. Off. . |
| 42451 | 12/1973 | Japan . |
| 028265 | 2/1991 | Japan . |

OTHER PUBLICATIONS

Braun et al, "Properties of Poly(Vinyl Chloride) Blends with Polycarbonates and Chlorinated Polyethylene", *Makromol. Chem., Macromol. Symp.* 29, 227–240 (1989).
U.S. Ser. No. 07/868,908 filed on Apr. 16, 1992.
U.S. Ser. No. 08/122,952 filed on Sep. 20, 1993.
Derwent 14801E/08.
Derwent 42590V/23.
Derwent 90-112599/15.
Derwent 89-238936/33.
Derwent 88-258546/37.
Derwent 86-340562/52.
Derwent 85-298629/48.
Derwent 79-A9554B/05.
Derwent 76-50821X/27.
Chemical Abstract ("CA") 112:8458g.
CA 110:96533q.
CA 96:13648z.
CA 94:175992t.
CA 92:52932z.
CA 91:141495f.
CA 91:50489t.
CA 89:220176q.
CA 89:187779p.
CA 89:101125n.
CA 89:54229n.
CA 88:165009q.
CA 88:105950c.
CA 88:8541q.
CA 87:202599j.
CA 109:24141s.
CA 105:192664a.
CA 106:68312r.
CA 105:154143x.
CA 104:6821f.
CA 73:25907w.
CA 75:130511b.
CA 83:148478w.
CA 85:95430g.
CA 99:196013t.
CA 102:133011a.
CA 103:124466w.
CA 104:130937n.

(List continued on next page.)

*Primary Examiner*—David Buttner

[57] ABSTRACT

A blend of polycarbonate and chlorinated polyethylene which has a desirable balance of impact and ignition resistance properties.

19 Claims, No Drawings

OTHER PUBLICATIONS

CA 105:98554t.
CA 107:238266u.
CA 112:8383d.
CA 112:78403j.
CA 113:79912g.
CA 97:24844g.
CA 97:24464h.
CA 89:216321r.
CA 89:198698n.
CA 87:54076u.
CA 112:140649z.
CA 108:141980c.
CA 107:41229c.
CA 106:85712p.
CA 105:44155v.
CA 102:158153m.
CA 100:104800k.
CA 99:12343w.
CA 99:46036p.
CA 97:24961t.
CA 94:122893c.
CA 92:77506b.
CA 88:171071v.
CA 86:172451q.
CA 86:73735d.
CA 86:44527g.
CA 111:196080d.
CA 111:88757w.
CA 110:232944d.
CA 109:38587d.
CA 108:151821t.
CA 107:8195r.
CA 105:181616k.
CA 105:98353b.
103:143079p.
CA 98:180167q.
CA 97:73283g.
CA 97:24755d.
CA 97:7465s.
CA 97:7464r.
CA 97:7463q.
CA 97:7460m.
CA 97:7398x.
CA 96:175629w.
CA 99:24190g.
CA 88:122170t.
CA 90:105030w.
CA 103:7506y.

1

BLENDS OF POLYCARBONATE AND CHLORINATED POLYETHYLENE

CROSS-REFERENCE TO RELATED APPLICATION

This is a divisional of application Ser. No. 08/139,368 filed Oct. 20, 1993 now U.S. Pat. No. 5,424,341.

FIELD OF THE INVENTION

This invention relates to compositions containing polycarbonate and chlorinated polyethylene, and to methods of preparation of such compositions.

BACKGROUND OF THE INVENTION

A polymeric blend containing polycarbonate and chlorinated polyethylene forms a useful composition for molding purposes. Such a composition is particularly desirable when an ethylenically unsaturated monomer is graft polymerized to the chlorinated polyethylene, when the composition also contains another molding polymer such as an epoxy resin or a polyester, when the composition also contains additives which impart flame or ignition resistance, when the composition also contains a vinyl aromatic/vinyl nitrile copolymer containing a high level of vinyl nitrile compound, or when the composition also contains additives which impart stability against thermal degradation.

SUMMARY OF THE INVENTION

In one aspect, this invention involves a composition of matter containing, in admixture, polycarbonate, and chlorinated polyethylene to which an ethylenically unsaturated monomer has been graft polymerized. In another aspect, this invention involves a composition of matter containing, in admixture, polycarbonate, chlorinated polyethylene and a molding polymer. In yet another aspect, this invention involves a composition of matter containing, in admixture, polycarbonate, chlorinated polyethylene and an additive which imparts flame or ignition resistance to the composition. In a further aspect, this invention involves a composition of matter containing, in admixture, polycarbonate, chlorinated polyethylene and a vinyl aromatic/vinyl nitrile copolymer which contains a high level of vinyl nitrile compound. This invention also involves a method of improving properties such as the impact resistance, ignition resistance, thermal stability and/or paintability of a polycarbonate/chlorinated polyethylene blend by graft polymerizing one or more ethylenically unsaturated monomers to the chlorinated polyethylene, and/or by admixing with such blend the other components of the compositions of this invention recited below.

It has been found that articles molded from the compositions of this invention exhibit desirably high levels of ignition and impact resistance, and stability against thermal degradation.

The compositions of this invention are useful, for example, in the production of films, fibers, extruded sheets, multi-layer laminates and molded or shaped articles of virtually all varieties, especially data storage apparatus, appliance and instrument housings, motor vehicle body panels and other parts and components for use in the automotive, electrical and electronics industries. The methods of this invention are useful for preparing compositions and molded articles having applications which are the same as or similar to the foregoing.

DETAILED DESCRIPTION OF THE INVENTION

The compositions of this invention are those in which (a) polycarbonate has been admixed in a polymeric blend with (b) chlorinated polyethylene. The compositions of this invention may, optionally, also contain (c) a styrenic copolymer, (d) an elastomeric impact modifier, and (e) one or more additional molding polymers. Suitable ranges of content for components (a) and (b) in the compositions of this invention, and suitable ranges of content for components (c), (d) and (e) when they are present, expressed in parts by weight of the total composition, are as follows:

(a) polycarbonate at least about 5 parts, advantageously at least about 20 parts, preferably at least about 30 parts, and more preferably at least about 40 parts, and yet not more than about about 95 parts, advantageously not more than about 90 parts, preferably not more than about 85 parts, and more preferably not more than about 75 parts;

(b) chlorinated polyethylene at least about 2 parts, advantageously at least about 15 parts, preferably at least about 20 parts, and more preferably at least about 30 parts, and yet not more than about about 95 parts, advantageously not more than about 80 parts, preferably not more than about 60 parts, and more preferably not more than about 50 parts;

(c) styrenic copolymer at least about 5 parts, advantageously at least about 10 parts, preferably at least about 15 parts, and more preferably at least about 20 parts, and yet not more than about about 75 parts, advantageously not more than about 55 parts, preferably not more than about 50 parts, and more preferably not more than about 45 parts;

(d) elastomeric impact modifier at least about 0.1 part, advantageously at least about 1 parts, preferably at least about 3 parts, and more preferably at least about 5 parts, and yet not more than about about 50 parts, advantageously not more than about 45 parts, preferably not more than about 40 parts, and more preferably not more than about 35 parts; and (e) molding polymer at least about 0.1 part, advantageously at least about 1 parts, preferably at least about 3 parts, and more preferably at least about 5 parts, and yet not more than about about 65 parts, advantageously not more than about 45 parts, preferably not more than about 40 parts, and more preferably not more than about 35 parts.

The number of weight parts of the various components from which the compositions of this invention may be prepared may, but need not necessarily, total to 100 weight parts.

Also included within this invention are the reaction products, if any, of the above named components when admixed in the compositions of this invention.

Preparation of the compositions of this invention can be accomplished by any suitable mixing means known in the art. Typically the polycarbonate and chlorinated polyethylene, and other components or additives which are optionally present in the compositions of this invention, are dry blended in a tumbler or shaker in powder or particulate form with sufficient agitation to obtain thorough distribution thereof. If desired, the dry-blended formulation can further be subjected to malaxation, or to shearing stresses at a temperature sufficient to cause heat plastification thereof, for example in an extruder with or without a vacuum. Other apparatus which can be used in the mixing process include, for example, a roller mill, a Henschel mixer, a ribbon blender, a Banbury mixer, or a reciprocating screw injection molding machine. The components may be mixed simultaneously or in any sequence.

When softened or melted by the application of heat, the compositions of this invention can undergo fabrication and can therein be formed or molded using conventional techniques such as compression, injection molding, gas assisted injection molding, calendering, vacuum forming, thermoforming, extrusion and/or blow molding techniques, alone or in combination. The compositions can also be formed, spun or drawn into films, fibers, multi-layer laminates or extruded sheets, or can be compounded with one or more organic or inorganic substances, on any machine suitable for such purpose.

Component (a) in the compositions of this invention is a polycarbonate, which can be prepared from a dihydroxy compound such as a bisphenol, and a carbonate precursor such as a disubstituted carbonic acid derivative, a haloformate (such as a bishaloformate of a glycol or dihydroxy benzene), or a carbonate ester such as diphenyl carbonate or a substituted derivative thereof. These components are often reacted by means of the phase boundary process in which the dihydroxy compound is dissolved and deprotonated in an aqueous alkaline solution to form bisphenolate and the carbonate precursor is dissolved in an organic solvent. The aqueous alkaline solution has a pH in excess of 7.0, often in excess 8.0 or 9.0, and can be formed in water from a caustic soda, such as NaOH, or from other bases such as those included in the alkali metal and alkaline earth metal phosphates, bicarbonates, oxides and hydroxides. Base is typically used in an amount of about 2 to 4, preferably about 3 to 4, moles per mole of dihydroxy compound.

These components are often reacted by means of a mixture prepared initially from the aromatic dihydroxy compound, water and a non-reactive organic solvent immiscible with water selected from among those in which the carbonate precursor and polycarbonate product are soluble. Representative solvents include chlorinated hydrocarbons such as methylene chloride, 1,2-dichloroethane, tetrachloroethane, chlorobenzene, and chloroform, to which tetrahydrofuran, dioxane, nitrobenzene, dimethyl sulfoxide, xylene, cresol or anisole may be added, if desired. Caustic soda or other base is then added to the reaction mixture to adjust the pH of the mixture to a level at which the dihydroxy compound is activated to dianionic form. A reducing agent such as sodium sulfite or sodium dithionite can also be advantageously added to the reaction mixture as well.

A carbonate precursor is contacted with an agitated mixture of the aqueous alkaline solution of the dihydroxy compound, and, for such purpose, the carbonate precursor can be bubbled into the reaction mixture in the form of a gas, or can be dissolved and introduced in solution form. Carbonater precursor is typically used in an amount of about 1.0 to 1.8, preferably about 1.2. to 1.5, moles per mole of dihydroxy compound. The mixture is agitated in a manner which is sufficient to disperse or suspend droplets of the solvent containing the carbonate precursor in the aqueous alkaline solution. Reaction between the organic and aqueous phases created by such agitation yields the bis(carbonate precursor) ester of the dihydroxy compound. For example, if the carbonate precursor is a carbonyl halide such as phosgene, the products of this initial phase of the process are monomers or oligomers which are either mono- or dichloroformates, or contain a phenolate ion at each terminus.

These intermediate mono- and oligocarbonates dissolve in the organic solvent as they form, and they can then be condensed to a higher molecular weight polycarbonate by contact with a coupling catalyst of which the following are representative: a tertiary amine such as triethyl amine, dimethyl amino pyridine or N,N-dimethyl aniline; a cyclic aza compound such as 2,2,6,6-tetramethyl piperidine or 1,2-dimethylimidazole; an iminoether or iminocarboxylate compound such as 1-aza-2-methoxy-1-cycloheptene or t-butylcyclohexyliminoacetate; or a phosphonium, sulfonium, arsonium or quaternary ammonium compound such as cetyl triethylammonium bromide. Such a catalyst may be added to the reaction mixture before or after a dihydroxy compound is contacted with a carbonate precursor, and is typically used in an amount of about 0.01 to 0.1 moles per mole of dihydroxy compound.

The polycarbonate forming reaction can be run at a pH from above 7.0 to about 14, and at a temperature between 0° C. to 100° C., although usually not in excess of the boiling point (reflux temperature) of the solvent used. Frequently, the reaction is run at a temperature of about 0° C. to about 45° C.

Upon completion of polymerization, the organic and aqueous phases are separated to allow purification of the organic phase and recovery of the polycarbonate product therefrom. The organic phase is washed as needed in a centrifuge with dilute base, water and/or dilute acid until free of unreacted monomer, residual process chemicals and/or other electrolytes. Recovery of the polycarbonate product can be effected by spray drying, steam devolatilization, direct devolatilization in a vented extruder, or precipitation by use of an anti-solvent such as toluene, cyclohexane, heptane, methanol, hexanol, or methyl ethyl ketone.

In the melt process for preparation of polycarbonate, aromatic diesters of carbonic acid are condensed with an aromatic dihydroxy compound in a transesterification reaction in the presence of a basic catalyst such as sodium methylate, sodium bisphenolate, calcium acetate, phenyl benzoate, N-stearoylphenothiazine, quaternary ammonium chloride, an alkaline(hydroxy)fluoroborate, an alkali metal salt of benzoic acid, an iminocarboxylic acid, or basic metal oxides such as zinc, lead or antimony oxide. The reaction is typically run at about 250° C. to 300° C. under vacuum at a progressively reduced pressure of about 1 to 100 mm Hg. The reaction is run in the absence of solvent and typically yields lower viscosity grades of polycarbonate.

Polycarbonate can also be prepared in a homogeneous solution through a process in which a carbonate precursor, such as phosgene, is contacted with a solution containing an aromatic dihydroxy compound, a chlorinated hydrocarbon solvent and a substance, such as pyridine, dimethyl aniline or CaOH, which acts as both acid acceptor and condensation catalyst. Washing with acidified water removes the pyridine and its hydrochloride, and precipitation and repulping with an antisolvent such as heptane followed by filtration and distillation removes oligomers and unreacted monomer.

Examples of some dihydroxy compounds suitable for the preparation of polycarbonate include variously bridged, substituted or unsubstituted aromatic dihydroxy compounds (or mixtures thereof) represented by the formula

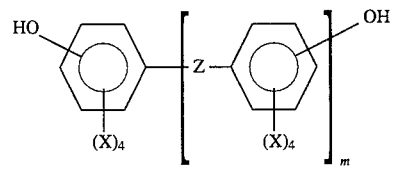

wherein:

(I) Z is (A) a divalent radical, of which all or different portions can be (i) linear, branched, cyclic or bicyclic, (ii) aliphatic or aromatic, and/or (iii) saturated or unsaturated, said divalent radical being composed of 1–35 carbon atoms together with up to five oxygen, nitrogen, sulfur, phosphorous and/or halogen (such as fluorine, chlorine and/or bromine) atoms; or (B) S, $S_2$, SO, $SO_2$, O or CO; or (C) a single bond;

(II) each X is independently hydrogen, a halogen (such as flourine, chlorine and/or bromine), a $C_1$-$C_{12}$, preferably $C_1$-$C_8$, linear or cyclic alkyl, aryl, alkaryl, aralkyl, alkoxy or aryloxy radical, such as methyl, ethyl, isopropyl, cyclopentyl, cyclohexyl, methoxy, ethoxy, benzyl, tolyl, xylyl, phenoxy and/or xylynoxy; or a nitro or nitrile radical; and (III) m is 0 or 1.

For example, the bridging radical represented by Z in the above formula can be a $C_2$–$C_{30}$ alkyl, cycloalkyl, alkylidene or cycloalkyidene radical, or two or more thereof connected by an aromatic or ether linkage, or can be a carbon atom to which is bonded one or more groups such as $CH_3$, $C_2H_5$, $C_3H_7$, n-$C_3H_7$, i-$C_3H_7$, cyclohexyl, bicyclo[2.2.1]heptyl, benzyl, $CF_2$, $CF_3$ $CCl_3$, $CF_2Cl$, CN, $(CH_2)_2COOCH_3$, or $PO(OCH_3)_2$.

Representative examples of dihydroxy compounds of particular interest are the bis(hydroxyphenyl)alkanes, the bis(hydroxyphenyl)cycloalkanes, the dihydroxydiphenyls and the bis(hydroxyphenyl)sulfones, and in particular are 2,2-bis(4-hydroxyphenyl)propane ("Bisphenol-A" or "Bis-A"); 2,2-bis(3,5-dihalo-4-hydroxyphenyl)propane ("Tetrahalo Bisphenol-A") where the halogen can be fluorine, chlorine, bromine or iodine, for example 2,2-bis(3,5-dibromo-4-hydroxyphenyl)propane ("Tetrabromo Bisphenol-A" or "TBBA"); 2,2-bis(3,5-dialkyl-4-hydroxyphenyl)propane ("Tetraalkyl Bisphenol-A") where the alkyl can be methyl or ethyl, for example 2,2-bis(3,5-dimethyl-4-hydroxyphenyl)propane ("Tetramethyl Bisphenol-A"); 1,1-bis(4-hydroxyphenyl)-1-phenyl ethane ("Bisphenol-AP" or "Bis-AP"); Bishydroxy phenyl fluorene; and 1,1-bis(4-hydroxyphenyl)cyclohexane.

Using a process such as is generally described above, a polycarbonate product can be obtained having a weight average molecular weight, as determined by light scattering or gel permeation chromatography, of 8,000 to 200,000 and preferably 15,000 to 40,000, and/or a melt flow value of about 3 to 150, preferably about 10 to 80 (as determined by ASTM Designation D 1238-89, Condition 300/1.2), although values outside these ranges are permitted as well. Molecular weight can be controlled by addition to the reaction mixture of a chain terminator which may be selected from monofunctional substances such as phenols, alcohols, amines, imides, carbonic acid chlorides, sulfonic acid chlorides, benzyltriethyl ammonium chloride, or phenylchlorocarbonates. A chain terminator may be added to the reaction mixture before or after a dihydroxy compound is contacted with a carbonate precursor, and is typically used in an amount of about 0.01 to 0.1 moles per mole of dihydroxy compound.

A branched rather than linear polycarbonate molecule can be obtained by adding to the reaction mixture a tri- or polyfunctional monomer such as a tri- or tetrafunctional phenol or carboxylic acid (or a derivative such as an acyl halide or anhydride), a bisphenol containing carboxylic acid side groups, or a nitrogen-containing compound such as cyanuric chloride, or compounds containing a mixture of such groups. Preferred branching agents are trimellitic acid, pyromellitic dianhydride or trisphenoxy ethane.

The preferred process of this invention is that in which an aromatic polycarbonate is prepared. An aromatic polycarbonate is defined herein with reference to the oxygen atoms, of the one or more dihydroxy compounds present in the polycarbonate chain, which are bonded to a carbonyl carbon. In an aromatic polycarbonate, all such oxygen atoms are bridged by a dihydroxy compound residue some portion of which is an aromatic ring.

Also included within the term "polycarbonate", as used herein, are various copolycarbonates, certain of which can be prepared by incorporating one or more different dihydroxy compounds into the reaction mixture. This can be accomplished by charging the different dihydroxy compounds to the reaction mixture either simultaneously or sequentially. If the dihydroxy compounds are added sequentially or added together but have different reactivities toward the carbonate precursor, a segmented or block copolycarbonate will typically result. Different dihydroxy compounds with the same reactivity typically yield a random copolycarbonate when reacted together. Alternatively, if oligocarbonates are formed separately from one or more different dihydroxy compounds, the oligocarbonates can then be coupled in a condensation reaction to yield a segmented or block copolycarbonate.

When a dicarboxylic acid such terephthalic acid or isophthalic acid (or an ester-forming derivative thereof) or a hydroxycarboxylic acid is used in the reaction mixture, or to form an oligomeric prepolymer, instead of one of the "different" dihydroxy compounds mentioned above, a poly(ester/carbonate) is obtained. A poly(ester/carbonate) may have, for example, about 25 to 90, preferably about 35 to 80, mole percent ester bonds. A poly(ester/carbonate)s is discussed in greater detail in Swart, U.S. Pat. No. 4,105,533, which is incorporated herein. In a preferred embodiment, the compositions of this invention exclude a poly(ester/carbonate).

Copolycarbonates can also be prepared, for example, by reaction of one or more dihydroxy compounds with a carbonate precursor in the presence of a chlorine- or amino-terminated polysiloxane, with a hydroxy-terminated poly(phenylene oxide) or poly(methyl methacrylate), or with phosphonyl dichloride or an aromatic ester of a phosphonic acid. Siloxane/carbonate block copolymers are discussed in greater detail in Paul, U.S. Pat. No. 4,596,970, which is incorporated herein.

The methods generally described above for preparing carbonate polymers suitable for use in the practice of this invention are well known; for example, several methods are discussed in detail in Schnell, U.S. Pat. No. 3,028,365; Glass, U.S. Pat. No. 4,529,791; and Grigo, U.S. Pat. No. 4,677,162, each of which is incorporated as a part hereof.

Component (b) in the compositions of this invention is chlorinated polyethylene ("CPE"). CPE can be prepared in a process in which a chlorine radical, generated from $Cl_2$ in a free-radical mechanism catalyzed by ultraviolet light or initiators, abstracts a hydrogen atom from a polyethylene chain, leaving a carbon radical. The carbon radical reacts with a molecule of chlorine to bond a chlorine atom to the polyethylene chain and liberates the other to continue the chain reaction. An alternative to $Cl_2$ as the chlorinating agent is $Cl_2O$. Polyethylene which retains regions of crystallinity during the reaction exhibit block chlorination whereas amorphous polyethylene, in which most or all portions of the polymer chain are accessible, exhibit random chlorination.

The polyethylene which is subjected to chlorination can be a homopolymer of ethylene or a copolymer of ethylene and one or more higher 1-alkenes such as propylene, butylene or octene. These polyethylenes typically have a density of about 0.90–0.97 g/cm$^3$, preferably about 0.935–0.967 g/cm$^3$, and a melt index of about 0.01–40 dg/min, preferably about 0.1–12 dg/min, and more preferably about 0.15–3 dg/min. Chlorination can occur in solution wherein a solvent such as a carbon tetrachloride is used at a temperature of about 60°–110° C. However, the process is more commonly run in an aqueous suspension wherein, in a first step, about 2 to 23 weight percent chlorination occurs at a temperature below the agglomeration temperature of the ethylene polymer, followed by chlorination to an extent of up to 75 percent, 5 preferably up to 48 percent, by weight in a second step at a temperature above the first temperature but at least 2° C. below the crystalline melting point of the ethylene polymer. Wetting agents such as sulfonates or polyphosphates may be advantageously employed in the aqueous process. Such an aqueous process and others are more particularly described in U.S. Pat. Nos. 3,454,544 and 3,563,974, each of which is incorporated herein. Chlorination can also occur in an anhydrous process wherein powdered polyethylene is agitated while contacted with a stream or atmosphere of heated chlorine gas, as more particularly described in U.S. Pat. No. 4,425,206, which is incorporated herein, or by reacting the polymers in molten form, as more particularly described in U.S. Pat. No. 3,909,486, which is also incorporated herein.

The chlorine content of the CPE thus produced can be about 25 to 50 percent by weight, is preferably about 30 to 45 percent by weight, and is more preferably about 34 to 42 percent by weight. The weight average molecular weight of CPE may be about 50,000 to 350,000, preferably about 80,000 to 240,000, and more preferably about 175,000 to 225,000. CPE is typically low in crystallinity, as measured by differential scanning calorimetry, for example below about 5 cal/gram. In a preferred embodiment, the residual crystallinity of CPE is at or below 1 cal/gram.

In an alternative embodiment, the CPE used in the compositions of this invention can be a chlorosulfonated polyethylene ("CSM"). In the preparation of CSM, a carbon radical is generated on the polyethylene chain in a manner analogous to the preparation of CPE. Addition of a chlorine atom or a molecule of SO$_2$ then follows at the site of the carbon radical. If SO$_2$ is added at the carbon radical, a sulfur radical is generated, and addition of a chlorine atom then occurs at the sulfur radical. In a typical CSM, —CH$_2$— groups, —CHCl— groups and —CHSO$_2$Cl— groups are present in a ratio of about 108/32/1. Preparation of CSM can occur in a homogenous solution using, for example, carbon tetrachloride or methylene chloride as the solvent. When chlorobenzene is the solvent, a temperature of about 105°–110° C. at atmospheric pressure is typical. An initiator such as 2-methyl-2,2'-azobispropanenitrile is used. A process such as the foregoing is more particularly described in U.S. Pat. No. 3,299,014, which is incorporated herein.

Component (b) in the compositions of this invention also includes a CPE in which one or more ethylenically unsaturated monomers has been graft polymerized onto the polyethylene backbone. Such graft polymerization may be accomplished via a free radical mechanism and is commenced after the CPE has been in contact with the ethylenically unsaturated grafting monomer(s) allowing the ethylenically unsaturated monomer(s) to disperse into the CPE. The purpose of this contact time is to enable the grafting monomer(s) to penetrate the CPE thereby permitting enhanced graft polymerization during the polymerization step to form a network structure of CPE and grafted polymers or copolymers. A CPE which is not grafted with ethylenically unsaturated monomers may be employed in combination with a CPE which is graft polymerized.

Ethylenically unsaturated grafting monomers, such as ethylenically unsaturated carboxylic acid esters, useful in preparation of a grafted CPE can be aliphatic or aromatic and include one or more of the following: acrylates, alkyl acrylates, lower alkyl acrylates, alkyl methacrylates, lower alkyl methacrylates, and other carboxylic acid esters including vinyl esters e.g. vinyl acetate, vinyl propionate, vinyl butyrate, vinyl stearate, vinyl benzoate and vinyl p-chlorobenzoate, and monovinyl aromatic compounds, including styrene, alpha methyl styrene, t-butyl styrene, acrylonitrile, and other ethylenically unsaturated monomers suitable for copolymerization with a styrenic monomer as described below with reference to a styrenic copolymer.

Preferred grafting monomers are the alkyl methacrylates, the lower alkyl methacrylates, vinyl acetate, and styrene, with the most preferred being methyl methacrylate. Another highly preferred monomer is vinyl acetate. Preferred mixtures of monomers include mixtures of acrylates and styrenics, of alkyl acrylates and styrenics, of lower alkyl acrylates and styrenics of alkyl methacrylates and styrenics, of lower alkyl methacrylates and styrenics, of acrylates and vinyl esters, of alkyl acrylates and vinyl esters, of lower alkyl acrylates and vinyl esters, of alkyl methacrylates and vinyl esters, and of lower alkyl methacrylates and vinyl esters. A highly preferred mixture is of methyl methacrylate and styrene. Another highly preferred mixture is of methyl methacrylate and vinyl acetate. As used in the description of the grafting monomers, the term alkyl refers to alkyl groups having from 1 to about 8 carbon atoms. The term lower alkyl refers to alkyl groups having from 1 to about 4 carbon atoms.

The polymerizable mixture comprises in a preferred embodiment from about 60 to 95 parts, more preferably from about 80 to 90 parts, by weight CPE and from about 5 to 40, more preferably from 10 to 20, parts by weight of an ethylenically unsaturated grafting monomer or comonomer mixture of monomers.

The preferred process for making a grafted CPE involves the mixing of CPE resin, an ethylenically unsaturated grafting monomer or mixture of monomers, water, initiators, and other additives such as a suspending agent in a suspension process reactor. The reactants are mixed through conventional stirred agitation and form a slurry suspension. Prior to the copolymerization in the aqueous suspension slurry it is important to disperse the monomers or comonomers into suspended CPE by diffusion. This intimately mixed CPE and monomer network will then copolymerize by free-radical initiation to form a network structure of CPE and grafted copolymers.

The reactor is then heated to a temperature of from about 70° C. to about 110° C. for a time of from about 4 hours to about 14 hours. Preferably the reactor is heated to a temperature of from about 75° C. to about 95° C. for a time of from about 6 hours to about 12 hours, and more preferably is heated to a temperature of from about 80° C. to about 90° C. for a time of from about 8 hours to about 10 hours.

After polymerization is complete, the grafted CPE product is dewatered and dried, for example, in a fluidized bed dryer, from about 4 to about 10 hours at a temperature of about 50° C. to about 75° C., preferably from about 5 to about 10 hours at a temperature of about 55° C. to about 70° C., and more preferably from about 6 to about 9 hours at a temperature of about 60° C. to about 65° C.

Initiators useful in this preferred free radical polymerization process are the known organic perester and peroxide type initiators. Especially useful are the organic perester and peroxide initiators having a one hour half-life temperature of about 90° C.–120° C. Typical and useful perester and organic peroxide initiators are benzoyl peroxide, lauroyl peroxide, 1,1-di-(t-amylperoxy)-cyclohexane, 1-1-di-(t-butylperoxy)cyclohexane, and tertiary butyl peroctoate. Tertiary butyl peroctoate having a one hour half-life temperature of about 115° C. is the most preferred initiator.

For obtaining a good suspension, vigorous stirring is performed and a suspension stabilizer or suspending agent is used. The conventional suspension stabilizers are preferred in this invention and include such organic materials as the polyvinyl alcohols, polyalkylene oxides and cellulose derivatives, with the cellulose derivatives being most preferred. Typical of the most preferred cellulose derivatives are methyl cellulose, hydroxymethyl cellulose, and methyl hydroxypropyl cellulose with hydroxymethyl cellulose being most preferred.

Methods for making a grafted CPE resin are discussed in greater detail in commonly assigned U.S. application Ser. No. 07/868,908, filed Apr. 16, 1992, which is incorporated herein.

Component (c) in the compositions of this invention is a styrenic copolymer prepared from one or more styrenic monomers and one or more ethylenically unsaturated monomers copolymerizable with a styrenic monomer. The styrenic copolymer may be a random, alternate, block or grafted copolymer, and a mixture of more than one styrenic copolymer may be used as well.

Styrenic monomers of particular interest for use in preparation of a styrenic copolymer, in addition to styrene itself, include one or more of the substituted styrenes or vinyl aromatic compounds described by the following formula (it being understood that a reference to "styrene" herein is to be read as a reference to any of the styrenic or vinyl aromatic monomers described herein or any others of like kind):

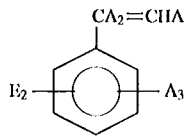

wherein each A is independently hydrogen, a $C_1$–$C_6$ alkyl radical or a halogen atom such as chlorine or bromine; and each E is independently hydrogen, a $C_1$–$C_{10}$ alkyl, cycloalkyl, alkenyl, cycloalkenyl, aryl, alkaryl, aralkyl or alkoxy radical, a halogen atom such as chlorine or bromine, or two E's may be joined to form a naphthalene structure. Representative examples of suitable styrenic monomers, in addition to styrene itself, include one or more of the following: ring-substituted alkyl styrenes, e.g. vinyl toluene, o-ethylstyrene, p-ethylstyrene, ar-(t-butyl)styrene, 2,4-dimethylstyrene; ring-substituted halostyrenes, e.g., o-chlorostyrene, p-chlorostyrene, o-bromostyrene, 2,4-dichlorostyrene; ring-alkyl, ring-halo-substituted styrenes, e.g. 2-chloro-4-methylstyrene and 2,6-dichloro-4-methylstyrene; ar-methoxy styrene, vinyl naphthalene or anthracene, p-diisopropenylbenzene, divinylbenzene, vinylxylene, alpha-methylstyrene, and alpha-methylvinyltoluene.

Ethylenically unsaturated monomers of particular interest for copolymerization with a styrenic monomer include one or more of those described by the formula: D—CH=C(D)—(CH$_2$)$_n$—G, wherein each D independently represents a substituent selected from the group consisting of hydrogen, halogen (such as fluorine, chlorine or bromine), $C_1$–$C_6$ alkyl or alkoxy, or taken together represent an anhydride linkage; G is hydrogen, vinyl, $C_1$–$C_{12}$ alkyl, cycloalkyl, alkenyl, cycloalkenyl, alkaryl, arylalkyl, alkoxy, aryloxy, ketoxy, halogen (such as fluorine, chlorine or bromine), cyano or pyridyl; and n is 0–9.

Representative examples of ethylenically unsaturated monomers copolymerizable with a styrenic monomer are those which bear a polar or electronegative group and include one or more of the following: a vinyl nitrile compound such as acrylonitrile, methacrylonitrile, ethacrylonitrile, alphachloroacrylonitrile and fumaronitrile; a diene such as butadiene, isoprene, isobutylene, piperylene, cyclopentadiene, natural rubber, chlorinated rubber, 1,2-hexadiene, methyl-1,3-pentadiene, 2,3-dimethyl-1,3-1,3-pentadiene, 2-methyl-3-ethyl-1,3-butadiene, 2-ethyl-1,3-pentadiene, 1,3- and 2,4-hexadienes, chloro- and bromo-substituted butadienes such as dichlorobutadiene, bromobutadiene, chloroprene and dibromobutadiene, and butadiene/isoprene and isoprene/isobutylene copolymers; 1,3-divinylbenzene; 2-phenyl propene; a $C_2$–$C_{10}$ alkylene compound including halo-substituted derivatives thereof such as vinyl or vinylidine chloride; the alpha,beta-ethylenically unsaturated carboxylic acids, such as acrylic acid, methacrylic acid, maleic acid, succinic acid, acotinic acid and itaconic acid, and their anhydrides and $C_1$–$C_{10}$ alkyl, aminoalkyl and hydroxyalkyl esters and amides, such as alkyl acrylates and methacrylates such as methyl acrylate, propyl acrylate, butyl acrylate, octyl acrylate, methyl alpha-chloro acrylate, methyl, ethyl or isobutyl methacrylate, hydroxyethyl and hydroxypropyl acrylates, aminoethyl acrylate and glycidyl methacrylate; maleic anhydride; an alkyl or aryl maleate or fumarate such as diethylchloromaleate or diethyl fumarate; an aliphatic or aromatic maleimide, such as N-phenyl maleimide, including the reaction product of a $C_1$–$C_{10}$ alkyl or $C_6$–$C_{14}$ aryl primary amine and maleic anhydride; methacrylamide, acrylamide or N,N-diethyl acrylamide; vinyl ketones such as methyl vinyl ketone or methyl isopropenyl ketone; vinyl or allyl acetate and higher alkyl or aryl vinyl or allyl esters; vinyl alcohols; vinyl ethers such as $C_1$–$C_6$ alkyl vinyl ether and their alkyl-substituted halo derivatives; vinyl pyridines; vinyl furans; vinyl aldehydes such as acrolein or crotonaldehyde; vinyl carbazole; vinyl pyrrolidone; N-vinylphthalimide; and an oxazoline compound includes those of the general formula

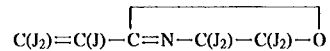

where each J is independently hydrogen, halogen, a $C_1$–$C_{10}$ alkyl radical or a $C_6$–$C_4$ aryl radical; and the like.

Examples of preferred styrenic copolymers are vinyl aromatic/vinyl nitrile copolymers such as styrene/acrylonitrile copolymer ("SAN"), styrene/maleic anhydride copolymer, styrene/glycidyl methacrylate copolymer, aryl maleimimde/vinyl nitrile/diene/styrenic copolymer, strene/alkyl methacrylate copolymer, styrene/alkyl methacrylate/glydicyl methacrylate copolymer, styrene/butyl acrylate copolymer, methyl methacryalte/acrylonitrile/butadiene/styrene copolymer, or a rubber-modified vinyl aromatic/vinyl nitrile copolymer such as an ABS, AES or ASA copolymer.

ABS (acrylonitrile/butadiene/styrene copolymer) is an elastomeric-thermoplastic composite in which vinyl aromatic/vinyl nitrile copolymer is grafted onto a polybutadiene substrate latex. The polybutadiene forms particles of rubber—the rubber modifier or elastomeric component—which are dispersed as a discrete phase in a thermoplastic matrix formed by random vinyl aromatic/vinyl nitrile copolymer. Typically, vinyl aromatic/vinyl nitrile copolymer is both occluded in and grafted to the particles of rubber. AES (acrylonitrile/EPDM/styrene) copolymer is a styrenic copolymer which is obtained when vinyl aromatic/vinyl nitrile copolymer is rubber-modified by grafting vinyl aromatic/vinyl nitrile copolymer to a substrate made up of an EPDM (ethylene/propylene/non-conjugated diene) rubber. AES copolymers are discussed in greater detail in Henton, U.S. Pat. No. 4,766,175, which is incorporated as a part hereof. A vinyl aromatic/vinyl nitrile copolymer can also be crosslinked to an alkyl acrylate elastomer to form a rubber-modified styrenic copolymer, as in the case of an ASA (acrylonitrile/styrene/acrylate) copolymer, which is discussed in greater detail in Yu, U.S. Pat. No. 3,944,631, which is also incorporated as a part hereof.

The monomers copolymerized to form a styrenic copolymer may each be used in virtually any amount from 1 to 99 weight percent, but a styrenic copolymer will typically contain at least about 15 percent by weight, preferably at least about 35 percent by weight, and more preferably at least about 60 percent by weight of a styrenic monomer, with the balance being made up of one or more copolymerizable ethylenically unsaturated monomers. When rubber modified, a styrenic copolymer will typically contain at least about 15 percent by weight, preferably at least about 25 percent by weight, and more preferably at least about 35 percent by weight of a styrenic monomer, with the balance being made up of one or more copolymerizable ethylenically unsaturated monomers. In certain embodiments, a vinyl nitrile monomer is used in a styrenic copolymer in an amount of greater than 35 percent, typically greater than 40 percent, advantageously greater than 45 percent, desirably greater than 50 percent, preferably greater than 55 percent, and more preferably greater than 60 percent, by weight of the styrenic copolymer.

The elastomeric phase of a rubber-modified styrenic copolymer as employed in the compositions of this invention is up to about 45 percent, preferably about 5 to 40 percent, more preferably about 10 to 35 percent, by weight of the copolymer. The preferred elastomeric phase exhibits a glass transition temperature ($T_g$) generally less than 0° C., more preferably less than –30° C., and most preferably from about –110° C. to about –50° C. as determined by ASTM D-746-52T or -56T. The elastomeric phase advantageously has an average particle size of about 10 microns or less, preferably in the range from about 0.05 to about 5 microns, and more preferably in the range from about 0.1 to about 0.3 microns, and typically exhibits an intrinsic viscosity, as determined at 25° C. in toluene, of about 0.1 to about 5. In addition to the aforementioned monomeric components, it should be understood that the elastomeric phase may also contain relatively small amounts, usually less than about 2 weight percent based on the rubber, of a crosslinking agent such a divinylbenzene, diallylmaleate, ethylene glycol dimethacrylate and the like provided that such crosslinking does not eliminate the desired elastomeric character of rubber.

The molecular weight of a styrenic copolymer is not particularly critical so long as its melt flow viscosity is such that it can be melt blended with the other components of the compositions of this invention. Preferably, however, the melt flow viscosity of the styrenic copolymer as determined by ASTM D-1238-65T(1) is from about 0.01 to about 10, more preferably from about 0.1 to about about 5, and most preferably from about 2 to about 3, deciliters per minute. The type and amount of the ethylenically unsaturated monomer(s) in the styrenic copolymer are such that the solubility parameter of the styrenic copolymer is typically from about 9.2 to about 11.2, preferably from about 9.3 to about 10.8, although values outside such ranges are permitted as well.

When the ethylenically unsaturated monomer possesses a polar group, the polar group typically has a group moment of about 1.4 to 4.4 Debye units, although values outside such ranges are permitted as well.

A styrenic copolymer may be made by an emulsion, suspension or mass (bulk) method. For example, when ABS is made by emulsion polymerization, a rubber substrate latex is produced in an aqueous emulsion by a polymerization, which can be initiated by organic peroxides, persulfates or redox systems, of 1,3-butadiene alone or in combination with other vinyl monomers such as styrene or methacrylonitrile. The proportion of butadiene to other monomers in the substrate latex is usually in the range of about 2/1 to about 15/1. The rubber latex substrate is subjected to further aqueous emulsion polymerization, using similar initiators or azo compounds, with styrene and acrylonitrile monomers, and optionally other vinyl monomers, wherein the concentration of styrene is usually about 1.5 to 3.5 times that of acrylonitrile. SAN is formed, some of which is grafted to the rubber latex substrate, and some of which as free copolymer forms a rigid matrix. The latex containing both the grafted rubber and the free SAN is then mixed with a coagulant solution, heated and agitated to produce discrete particles of ABS resin. The slurry containing those particles is dewatered in a centrifuge, and the resin is dried.

When ABS is made by suspension polymerization, a pre-formed elastomeric (rubber) component, usually a polybutadiene or a butadiene/styrene copolymer, is dissolved in a mixture of styrene and acrylonitrile, and, optionally, other vinyl monomers. The preferred ratio of styrene to acrylonitrile is about 90/10 to about 60/40, and in the preferred recipe the rubber component constitutes from about 4 percent to less than about 40 percent of the product. The rubber component, monomers and initiator are charged to the reaction vessel and polymerization ensues at about 60°–140° C. until a conversion rate of about 15 percent to about 30 percent is reached, resulting in the production of a prepolymer. Phase inversion occurs, and the rubber precipitates from solution and becomes the discontinuous phase dispersed as particles ranging from 0.1 to 5 microns in size. The prepolymer is then placed in a suspension reactor in an aqueous solution containing a suspending agent, initiator and chain transfer agent. Typical suspending agents are carboxymethyl cellulose, polyvinyl alcohol, and polyglycol ethers. Typical initiators for the polymerization which occurs during suspension are t-butyl perbenzoate, di-t-butyl peroxide, or t-butylperoxy isopropyl carbonate. Agitation of the solution completes the polymerization. The process is completed by dewatering the slurry in a centrifuge, and moisture content is further reduced by flash drying.

When ABS is made by bulk or mass polymerization, it is formed by dissolving an elastomeric (rubber) component in the monomer mix, which contains styrene and acrylonitrile (and, optionally, other vinyl monomers), an initiator and, frequently, a chain transfer agent such as a mercaptan or a terpinolene. The reaction can, however, be thermally initiated. The styrene and acrylonitrile monomers polymerize at about 60°–100° C., some grafting to the rubber component, but most forming a monomer-polymer solution. As the relative volume of the monomer-SAN polymer phase increases, discrete rubber particles become dispersed in the matrix resulting from the monomer-SAN polymer phase. The rubber particles are stabilized by being grafted to SAN polymers at the interface between the particles and the SAN polymer matrix. Additional stabilization is furnished when monomer becomes occluded, and polymerizes, within the rubber particles. Because polymerization occurs completely within a monomer/polymer medium, viscosity increases as conversion increases. To allow continued agitation of the reaction mixture despite such increasing viscosity, diluents such as methyl ethyl ketone and ethylbenzene are added to the reactor. Upon the completion of polymerization, the melt is devolatilized using equipment such as a devolatilizing extruder of a flash evaporator, and vacuum is applied to remove unreacted monomers and diluents.

Methods for making ABS or other styrenic copolymers, as described above, are discussed in greater detail in Childers, U.S. Pat No. 2,820,773, Calvert, U.S. Pat. No. 3,238,275, Carrock, U.S. Pat. No. 3,515,692, Ackerman, U.S. Pat. No. 4,151,128, Kruse, U.S. Pat. No. 4,187,260, Simon, U.S. Pat. No. 4,252,911 Weber, U.S. Pat. No. 4,526,926, Rudd, U.S. Pat. No. 4,163,762 and Weber, U.S. Pat. No. 4,624,986, each being hereby incorporated as a part hereof.

Component (d) in the compositions of this invention is an elastomeric impact modifier, several different varieties of which, or a mixture thereof, are suitable for use herein. The elastomeric impact modifier as used herein typically has an elastomer or rubber content of greater than 45 percent by weight. One form which such elastomeric impact modifier may take is a thermoplastic elastomer, i.e. that which is frequently characterized, for example, in that it can be melted and recooled, or dissolved and reformed upon recovery from solvent, without undergoing any significant change in properties. A thermoplastic elastomer is usually also characterized by the randomness of the shape and size it assumes when mixed by shearing forces with the other components contained in the compositions of this invention, especially when heat is applied during such mixing. Because a thermoplastic elastomer is typically a long chain molecule, segments of a thermoplastic elastomer in the polymer composition matrix are generally elongated, linear ribbons or bands. The molecules tend to fuse and flow together in a continuous structure. However, chain coiling can yield globule-shaped segments of thermoplastic elastomer in the matrix.

One example of a thermoplastic elastomer is a block copolymer which can be either linear, branched, radial or teleblock, and can be either a di-block ("A-B") copolymer, tri-block ("A-B-A") copolymer, or radial teleblock copolymer with or without tapered sections, i.e. portions of the polymer where the monomers alternate or are in random order close to the point of transition between the A and B blocks. The A portion is frequently prepared by polymerizing one or more vinyl aromatic hydrocarbon monomers, and has a weight average molecular weight of about 4,000 to about 115,000, preferably about 8,000 to about 60,000. The B portion of the block copolymer typically results from polymerizing a diene and has a weight average molecular weight of about 20,000 to about 450,000, preferably about 50,000 to about 300,000. In an A-B di-block copolymer, each block, A or B, can vary from 10–90% of the total weight of the copolymer. In an A-B-A tri-block copolymer, the A end groups typically constitute about 2 wt % to about 55 wt % of the whole block copolymer, and preferably are between 5 wt % and 45 wt % of the whole block copolymer.

The A block of the block copolymer has properties characteristic of thermoplastic substances in that it has the stability necessary for processing at elevated temperatures and yet possesses good strength below the temperature at which it softens. The A block of a vinyl aromatic block copolymer is polymerized predominantly from the various styrenic monomers described above with respect to a styrenic copolymer, 5 but minor proportions of other copolymerizable ethylenically unsaturated monomers (also described above in the same context) may be used as well. The polymerization can be initiated by lithium metal, or alkyl- or aryl lithium compounds such as butyl lithium or isoamyl lithium. Polymerization is normally conducted at temperatures ranging from about –20° C. to about 100° C.

The B block of the copolymer can be formed, for example, simply by injecting suitable monomer into the reaction vessel and displacing the lithium radical from the just-polymerized A block, which then acts as an initiator because it is still charged. The B block is formed predominantly from substituted or unsubstituted $C_2$–$C_{10}$ dienes, particularly conjugated dienes such as butadiene or isoprene. Other diene or copolymerizable ethylenically unsaturated monomers (described above in connection with a styrenic copolymer) may be used in the formation of the B block provided that they are present at a level low enough to not alter the fundamental olefinic character of the B block. The B block will be characterized by elastomeric properties which allow it to to absorb and dissipate an applied stress and then regain its shape. In the A-B-A tri-block copolymer, the second end block A can be formed in a manner similar to the first, by injecting appropriate vinyl aromatic monomer into the reaction vessel.

To reduce oxidative and thermal instability, the block copolymers used herein can also desirably be hydrogenated to reduce the degree of unsaturation on the polymer chain and on the pendant aromatic rings. The block copolymer may be selectively hydrogenated by hydrogenating only the elastomeric block B. Typical hydrogenation catalysts utilized are Raney nickel, molybdenum sulfide, finely divided palladium and platinum oxide. The hydrogenation reaction is typically run at 75°–450° F. and at 100–1,000 psig for 10–25 hours.

The most preferred vinyl aromatic block copolymers are vinyl aromatic/conjugated diene block copolymers formed from styrene and butadiene or styrene and isoprene. When the styrene/butadiene copolymers are hydrogenated, they are frequently represented as styrene/(ethylene/butylene) copolymer in the di-block form, or as styrene/(ethylene/butylene)/styrene copolymer in the tri-block form. When the styrene/isoprene copolymers are hydrogenated, they are frequently represented as styrene/(ethylene/propylene) copolymer in the di-block form, or as styrene/(ethylene/propylene)/styrene copolymer in the tri-block form. Vinyl aromatic/diene block copolymers such as are described above are discussed in greater detail in Holden, U.S. Pat. No. 3,265,766, Haefele, U.S. Pat. No. 3,333,024, Wald, U.S. Pat. No. 3,595,942, and Witsiepe, U.S. Pat. No. 3,651,014, each of which is incorporated herein, and many are available commercially as the varios Kraton™ elastomers from Shell Chemical Company.

Linear, branched, radial or teleblock A-B-A or A-B block copolymer thermoplastic elastomers can also be prepared from materials other than vinyl aromatic systems. These other copolymers also have a rigid block "A" having a $T_g$ above room temperature (approximately 23°–25° C.) and a rubbery block "B" having a $T_g$ below room temperature. Examples of typical pairings of the various materials used to form the respective A and B blocks of such other block copolymer thermoplastic elastomers are shown below in Table I.

TABLE I

Block Copolymer Pairings

| A block | B block |
| --- | --- |
| polyethylene | ethylene/butylene copolymer |
| polyurethane | polyester polyether |
| polyester | polyether |
| polypropylene | EPDM rubber |

These non-vinyl aromatic block copolymer thermoplastic elastomers can also be prepared, for example, by anionic polymerization using an alkyllithium initiator. Thermoplastic elastomers based on urethane are discussed in greater detail in Schollenberger, U.S. Pat. No. 3,015,650 and Saunders, U.S. Pat. No. 3,214,411; and those based on copolyester-ether are discussed in Witsiepe, U.S. Pat. No. 3,651,014, each of which is incorporated herein.

Other thermoplastic elastomers useful in the compositions of this invention are those based generally on a long-chain, hydrocarbon backbone ("olefinic elastomers"), which may be prepared predominantly from various mono- or dialkenyl monomers and may be grafted with one or more styrenic monomers. Representative examples of a few olefinic elastomers which illustrate the variation in the known substances which would suffice for such purpose are as follows: butyl rubber; chlorinated polyethylene rubber; chlorosulfonated polyethylene rubber; an olefin polymer or copolymer such as ethylene/propylene copolymer or ethylene/propylene/diene copolymer, which may be grafted with one or more styrenic monomers; neoprene rubber; nitrile rubber; polybutadiene and polyisoprene.

An example of a preferred olefinic elastomer is a copolymer which has a a glass transition temperature ($T_g$) less than 0° C. prepared from (i) at least one olefin monomer such as ethylene, propylene, isopropylene, butylene or isobutylene, or at least one conjugated diene such as butadiene, and the like, or mixtures thereof; and (ii) an ethylenically unsaturated monomer carrying an epoxide group (for example, glycidyl methacrylate), and, optionally, (iii) an ethylenically unsaturated monomer which does not carry an epoxide group (for example, vinyl acetate). $T_g$ is the temperature or temperature range at which a polymeric material shows an abrupt change in its physical properties, including, for example, mechanical strength. $T_g$ can be determined by differential scanning calorimetry.

The random shape and size assumed in the polymer composition matrix by a thermoplastic elastomer is to be distinguished from the shape and size assumed by a core-shell graft copolymer. A core-shell graft 5 copolymer is typically present in the polymer matrix in a bead shape both before and after mixing by application of shearing forces, whether heat is used or not, and is usually present in a rather narrow size range, for example 0.05–0.8 microns. The retention of this core-shell, or spherical, shape by the graft copolymer, even after heating and mixing, results from the fact that the outer layers, which surround the core, are formed by grafting appropriate monomers onto the core. A core-shell graft copolymer typically cannot be melted and recooled without a significant change in properties because the graft copolymer will tend to decompose or crosslink, and the bead-shaped segments of graft copolymer will tend to agglomerate upon melting, making dispersion of them by mixing difficult.

Representative examples of the core-shell graft copolymer elastomers suitable for use herein are those which are based on either a diene rubber, an alkyl acrylate rubber, or on mixtures thereof.

A core-shell graft copolymer based on a diene rubber contains a substrate latex, or core, which is made by polymerizing a diene, preferably a conjugated diene, or by copolymerizing a diene with a mono-olefin or a polar vinyl compound, such as styrene, acrylonitrile, or an alkyl ester of an unsaturated carboxylic acid such as methyl methacrylate. The substrate latex is typically made up of about 40–85% diene, preferably a conjugated diene, and about 15–60% of the mono-olefin or polar vinyl compound. The elastomeric core phase should have a glass transition temperature ("$T_g$") of less than about 10° C., and preferably less than about –20° C. A mixture of ethylenically unsaturated monomers is then graft polymerized to the substrate latex. A variety of monomers may be used for this grafting purpose, of which the following are exemplary: vinyl compounds such as vinyl toluene or vinyl chloride; vinyl aromatics such as styrene, alpha-methyl styrene or halogenated styrene; acrylonitrile, methacrylonitrile or alpha-halogenated acrylonitrile; a $C_1$–$C_8$ alkyl acrylate such as ethyl acrylate or hexyl acrylate; a $C_1$–$C_8$ alkyl methacrylate such as methyl methacrylate or hexyl methacrylate; glycidyl methacrylate; acrylic or methacrylic acid; and the like or a mixture of two or more thereof. The preferred grafting monomers include one or more of styrene, acrylonitrile and methyl methacrylate.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is about 60–80 parts by weight substrate latex, about 10–20 parts by weight of each of the first and second monomer shells. A preferred formulation for an MBS rubber is one having a core built up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Cuffman, U.S. Pat. No. 3,657,391, and Fromuth, U.S. Pat. No. 4,180,494, each of which is incorporated herein.

An core-shell graft copolymer based on an alkyl acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2$–$C_6$, most preferably butyl acrylate. The elastomeric core phase should have a $T_g$ of less than about 10° C., and preferably less than about –20° C. About 0.1 to 5 weight percent of (i) a cross-linking monomer which has a plurality of addition polymerizable reactive groups all of which polymerize at substantially the same rate, such as butylene diacrylate, and (ii) a graft-linking monomer which has a plurality of addition polymerizable reactive groups some of which polymerize at substantially different rates than others, such as diallyl maleate, is typically polymerized as part of the elastomeric core.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Ethylenically unsaturated monomers such as glycidyl methacrylate, or an alkyl ester of an unsaturated carboxylic acid, for example a $C_1$–$C_8$ alkyl acrylate like methyl acrylate, hydroxy ethyl acrylate or hexyl acrylate, or a $C_1$–$C_8$ alkyl methacrylate such as methyl methacrylate or hexyl methacrylate, or mixtures of any of the foregoing, are some of the vinyl monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 45% to about 95% by weight of an elastomeric core and about 60% to about 5% of a rigid thermoplastic phase. The elastomeric core can be polymerized from about 75% to about 99.8% by weight $C_1$–$C_6$ acrylate, preferably n-butyl acrylate. The rigid thermoplastic phase can be polymerized from at least 50% by weight of $C_1$–$C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928, each of which is incorporated herein.

Component (e) in the compositions of this invention is a molding polymer selected from (i) polyacetal, (ii) polyacrylate, (iii) polyamide, (iv) an epoxy resin, (v) ethylene/carbon monoxide copolymer, (vi) polyester, (vii) poly(phenylene ether), (viii) polystyrene, (ix) polyurethane, and (x) poly(vinyl chloride), and mixtures thereof.

Component (e)(i) is a polyacetal, a polymer which arises by the bond opening and polymerization of the carbonyl group of an aldehyde such as formaldehyde, acetaldehyde or a higher $C_3$–$C_6$ aldehydes. Formaldehyde, for example, undergoes cationic polymerization in ether or methylene chloride at –78° C. using $SnCl_4$ or $FeCl_3$ as an initiator.

Component (e)(ii) is an acrylate polymer, which is defined as a polymer prepared by homopolymerization of an alkyl acrylate or an alkyl methacrylate or by copolymerization of a mixture of the two; and includes a mixture of any such homopolymers or copolymers.

An alkyl acrylate or methacrylate can be prepared, for example, by reaction of an alkyl alcohol or diazoalkane with acrylic or methacrylic acid. Acrylic acid is prepared by the vapor phase oxidation of propylene. The acrylic acid/alcohol esterification reaction can be run at about 80° C. using an acid catalyst such as $H_2SO_4$. Methacrylic acid may be prepared by the oxidation of isobutylene or t-butyl alcohol. A methacrylate may also be prepared by reacting acetone cyanohydrin with an excess of concentrated sulfuric acid to form methacrylamide sulfate, which, when then reacted with an alcohol, yields a methacrylate. A $C_1$–$C_{10}$ acrylate or methacrylate may be used for polymer preparation herein, with $C_1$–$C_6$ acrylate or methacrylate being preferred, and $C_1$–$C_4$ being more preferred.

The acrylate polymer used in the compositions of this invention can be prepared in a polymerization reaction initiated by free radical initiators such as azo compounds or peroxides, preferably in the absence of oxygen. Methacrylate monomers are most often polymerized in bulk, but this method has little application for acrylate monomers. Acrylate and methacrylate monomers may be polymerized in an organic solution, using, for example, an aromatic hydrocarbon, ester, ketone or chlorohydrocarbon (such as toluene, chlorobenzene or 3-pentanone) as the solvent. A chain transfer agent such as a thiol may be used to control molecular weight. Polymerization can also occur in an aqueous emulsion in which an anionic surfactant, such as an alkylarene sulfate or phosphate, a nonionic surfactant, such as an alkyl or aryl polyoxyethylene, or a cationic surfactant is used. Suspension polymerization is used primarily for methacrylates and involves suspending in water 0.1–5 mm droplets of monomer which are stabilized by a protective colloid such as cellulose, poly(vinyl alcohol), gelatin or talc. The initiator should be soluble in the monomer but not in water. Acrylates and methacrylates can also be polymerized in a non-aqueous dispersion using an organic diluent such as hexane or methanol.

When an acrylate and a methacrylate are copolymerized, the acrylate, each can be used in the mix of reactants from which the copolymer results in an amount of up to about 99.0 parts by weight, based on the total weight of the copolymer. When the acrylate polymer takes the form of a copolymer, the copolymer may be a random, alternate, block or grafted copolymer.

Component (e)(iii) is a polyamide. The polyamides suitable for use in this invention can be produced by the condensation of bifunctional monomers, typically those containing acid and amine functionalities, where the monomers have either the same or different functional groups. For example, if hexamethylenediamine is reacted with adipic acid, an -[-AABB-]- type polyamide is obtained wherein the diamine and diacid units alternate. However, when a monomer such as an amino acid or a cyclic lactam is self-polymerized, an -[-AB-]- type polyamide results from a regular head-to-tail polymerization, similar to an addition mechanism. For example, when nylon-6 is made, heat is applied to raise the temperature of the caprolactam to 240°–280° C., and catalysts such as water and phosphoric acid are added to the system. Hydrolysis ensues, the ring opens and polymerization takes place while unreacted monomer is removed from the system and recycled. Polycondensation and growth of the polymer chain results from the removal of water from the system.

The polyamides suitable for use herein also include those wherein two or more different diamines, and/or different diacids and/or different amino acids are polymerized together to form a random or block co-polyamide. The carbon chain between the functional groups may be linear or branched aliphatic, alicyclic or aromatic hydrocarbons. The chains may also contain hetero atoms such as oxygen, sulfur or nitrogen. Also suitable for use herein are block or random copolymers, such as those resulting, for example, from melt mixing two or more different polyamides, from reaction of a diamine or diacid monomer that contains an amide linkage with another diamine or diacid, or from reaction of a diisocyanate with a dicarboxylic acid.

Polyamides are most often prepared by direct amidation in which the amine group of a diamine or an amino acid bonds to the carboxyl of a diacid with the accompanying elimination of water. Derivatives of the acid function, such as an ester, acyl halide or amide, may be used as an alternative source of the carboxyl functionality, in which case the by-product is an alcohol, a hydrogen halide or ammonia, respectively. For example, when an acid chloride is used, the diacid chloride in a water-immiscible solvent can be added to an aqueous solution of the diamine, an inorganic base and a surface active agent, and interfacial polymerization occurs in the organic layer. When polymerization occurs in solution, an organic base such as pyridine is used as the acid acceptor. Formation of polyamides can also occur by ring-opening polymerization of a caprolactam, such as when nylon-6 is made from ε-caprolactam. Such a reaction can be run at high temperature, in which case water or an amino acid is used as the initiator, or if it is run at low temperature, the ring opening is effected by a strong base, such as NaOH, usually with the addition of an acylating cocatalyst such as acetic anhydride.

Polyamides as described above, and methods for preparing same, are discussed in greater detail in U.S. Pat. Nos. 2,071,253, 2,130,523 and 2,130,948, each of which is incorporated as a part hereof.

Component (e)(iv) is an epoxy resin. An epoxy resin as utilized in the compositions of this invention is typically prepared from an epihalohydrin such as epichlorohydrin, which is reacted in the presence of a base with a compound containing at least two active hydrogen atoms. Representative materials used as a base for such purpose include caustics such as the alkali metal and alkaline earth oxides and hydroxides. An active hydrogen atom is one which can be abstracted by such a base to form an anion. When the active-hydrogen-containing compound is reacted with epichlorohydrin, each anion formed thereon by the deprotonating or catalytic action of the base opens the epoxide ring at the alpha carbon on an epichlorohydrin molecule to create a hydroxyl group on the beta carbon. Dehydrohalogenation then occurs at each such location to regenerate an epoxide ring at the beta and gamma carbons. If, in the active-hydrogen-containing compound, hydrogen was abstracted from oxygen, the product at this point may for practical purposes be represented as the diglycidyl ether of the active-hydrogen-containing compound. When other molecules of the deprotonated active-hydrogen-containing compound attack unreacted epichlorohydrin or attack the epoxide ring having been formed as each terminus of the diglycidyl ether of the active-hydrogen-containing compound, a polymer is formed which is a poly(hydroxy ether) containing epoxide rings at its termini. It is possible that one terminus of such polymer could be occupied by an unabstracted hydrogen atom rather than an epoxide ring. An epoxy resin suitable for ue herein can generally be represented by the following structure:

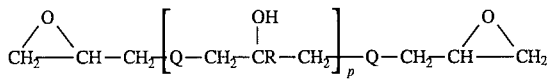

wherein Q is the residue of the active-hydrogen-containing compound; R is hydrogen or $C_{1-15}$ alkyl or alkoxy; and p, which can range from zero to about 100, is the degree of polymerization (number of repeating units). P can, for example, be less than sixty, is advantageously less than forty, is preferably less than twenty, and is more preferably less than ten. P can, for example, be 0 to about 20, 0 to about 10, about 1 to 10, or about 1 to 5.

Use of an excess of epichlorohydrin suppresses the molecular weight of the epoxy resin; a ratio of as little as 2/1, epichlorohydrin to active-hydrogen-containing compound, is typically sufficient to yield a degree of polymerization of 0.35 or less. However, higher molecular weight epoxy resins can be prepared using the process described above by reacting the active-hydrogen-containing compound with only a slight excess of epichlorohydrin. In this direct (or taffy) process, the resins usually produced are those which have a degree of polymerization of 4 or less.

In the fusion process, the diglycidyl ether of the active-hydrogen-containing compound is reacted with an additional charge of the active-hydrogen-containing compound. Caustic (or other proton acceptor such as triethanolamine, a substitiuted imidazole or $Na_2CO_3$) is used in the reaction in only a catalytic amount as the oxyanion regenerates itself each time an epoxide ring is opened and secondary hydroxyl group is formed. Reaching high molecular weight is dependent on employment of agitation, and of higher temperature (up to about 150° C.) and pressure than used in the direct method, because of the viscosity of the reaction mass. Epoxy resins with a degree of polymerization of 30 or more can be prepared by the fusion process. Epoxy resins can also be prepared by direct epoxidation of the C=C bond in an olefin by a peracid such as peroxybenzoic acid, $C_6H_5CO_2OH$.

Epoxy resins, prepared as described above, can be esterified with saturated or unsaturated fatty acids at either the terminal epoxide ring or at a pendant hydroxyl site along the polymer backbone. Such an esterification reaction is typically conducted in an inert atmosphere at about 225°–260° C., with the removal of water as a by-product.

Oxyanions for use in the preparation of an epoxy resin can be derived from the various bisphenols such as are described above with respect to the preparation of polycarbonate. Use of oxyanions prepared from bisphenols yields an epoxy resin of the type which is frequently referred to as a phenoxy resin. However, oxyanions can also be prepared from bis p-hydroxy phenyl fluorene, from a bisphenol where the aromatic rings are hydrogenated, with the use of trishydroxy phenols or any of the branching agents mentioned above with respect to the preparation of polycarbonate, or from a $C_2$–$C_{18}$ alkyl or alkylidene or a $C_4$–$C_{20}$ cycloalkyl or cycloalkylidene diol or triol.

Bisphenol-A is an example of an especially preferred aromatic diol to be used in the preparation of the epoxy resin of this invention. When a halogenated bisphenol (containing, for example, bromine) is used to prepare the epoxy resin, an epoxy resin having good flame retardant properties, such as D.E.R.® 542 epoxy resin (available from The Dow Chemical Company), is obtained. An exemplary halogenated epoxy resin can be represented by the following general formula:

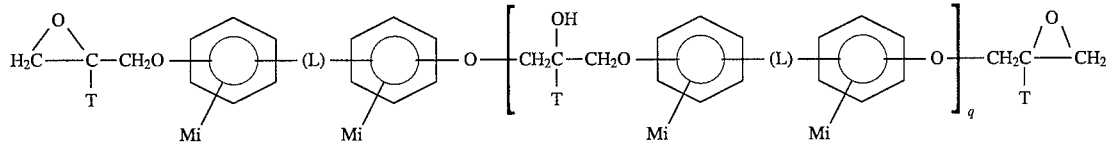

where each T can independently be hydrogen or an aliphatic hydrocarbyl group having from 1 to about 3 carbon atoms and is preferably hydrogen; each M is independently chlorine or bromine and is preferably bromine in each occurrence; each i is independently 1 or 2 and is preferably 2 in each occurrence; each L is independently a divalent hydrocarbyl group having from 1 to about 12 carbon atoms, preferably 3 carbon atoms; and q can be any value from 0 to 20 (not necessarily an integer) and is preferably from 0 to 6, more preferably from 0 to 1. The term hydrocarbyl as employed herein means any aliphatic, cycloaliphatic or aromatic groups. Compounds of this type are commercially available as DER 542, DER 511 and QUATREX 6410 brands of epoxy resin from The Dow Chemical Company and DP 452 brand epoxy resin from Ciba Geigy.

The epoxy resins useful in this invention can also be prepared from the reaction of a novolac and epihalohydrin. Representative novolacs are phenol/formaldehyde condensates in which multiple phenol functionalities are joined by methylene bridges. In novolac epoxies, multiepoxy functionality can increase with increasing molecular weight because the polymer is formed from the methylene bridges, leaving each phenolic hydroxyl group free to react with epichlorohydrin to form a pendant epoxide ring. The novolac may additionally be prepared from a substituted phenol. Novolac epoxies may be generally represented by a formula such as

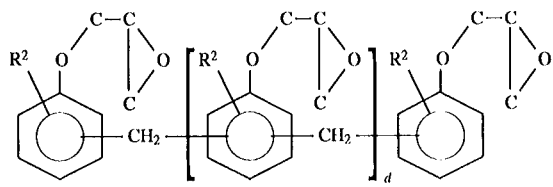

where d is 0 to about 10 and each $R^2$ is independently hydrogen or $C_{1-15}$ alkyl or alkoxy. An example of a novolac epoxy suitable for use herein is D.E.N.® 431 epoxy resin (available from The Dow Chemical Company). Epoxy resins such as are described above, and methods for preparing same, are discussed in greater detail in Perry, U.S. Pat. No. 3,948,855 and Doorakian, U.S. Pat. No. 4,302,574, each of which is incorporated herein.

Component (c)(v) is a polyester. A polyester as utilized in the compositions of this invention may be made by the self-esterification of hydroxycarboxylic acids, or by direct esterification, which involves the step-growth reaction of a diol with a dicarboxylic acid with the resulting elimination of water, giving a polyester with an -[-AABB-]- repeating unit. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure. The reaction may be run in bulk or in solution using an inert high boiling solvent such as xylene or chlorobenzene with azeotropic removal of water.

Alternatively, but in like manner, ester-forming derivatives of a dicarboxylic acid can be heated with a diol to obtain polyesters in an ester interchange reaction. Suitable acid derivatives for such purpose are alkyl esters, halides, salts or anhydrides of the acid. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often used when acidolysis occurs in the interchange reaction. Diol derivatives such as an acetate can be used effectively when it is desired to conduct acidolysis. In ester interchange, an ester intermediate is formed at about 140°–210° C., and this intermediate is then condensed in the melt at about 230°–280° C. under reduced (e.g. 1 mm Hg) pressure. Preparation of polyarylates, from a bisphenol and an aromatic diacide, can be conducted in an interfacial system which is essentially the same as that used for the preparation of polycarbonate.

The molecular weight of polyester can be increased by adding a chain coupling agent, such as diphenyl carbonate, to the melt reaction mixture just prior its completion. Or, to achieve higher weight by solid state polymerization, polyester product of intermediate weight can be heated in a vacuum or stream of inert gas, first to a temperature where it crystallizes and then to a temperature close to its melting point.

Polyesters can also be produced by a ring-opening reaction of cyclic esters or $C_4$–$C_7$ lactones, for which organic tertiary amine bases phosphines and alkali and alkaline earth metals, hydrides and alkoxides can be used as initiators.

Whether a polyester is crystalline or amorphous is typically a function of the symmetry of the starting materials from which it is made. When one or more hydrogens on the diol and/or the diacid (or ester-forming derivative) which are reacted to form a polyester are replaced by larger radicals such as alkyl or halogen, the intermolecular spacing of the resulting molecules may be disrupted if the presence of the substituent creates asymmetric or irregularly shaped molecules. The component containing the substituent may also be combined into the polyester molecule in random orientation, resulting in structural irregularity in the polymer chain. Factors which can influence crystallization of ring-containing polyesters are the directionality of the ester groups, the stereochemistry of the rings and variations in symmetry where the rings are bridged. For example, a poly(alkylene isophthalate) crystallizes only with difficulty, and a polyester prepared from phthalic acid typically does not crystallize at all. However, where the amount of monomer containing the asymmetry is small in relation to the remainder of the starting materials, the portion of the resulting polyester molecule which suffers from structural irregularity will also be small, and crystallization will typically not be impeded. A crystalline material may be identified by the endotherm it displays on a differential scanning calorimeter. A suitable polyester for use in this invention is a crystalline polyester having a melting point of 254°–260° C.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene arylenedicarboxylate), a poly(arylene alkanedicarboxylate), or a poly(arylene arylenedicarboxylate) is therefore appropriate for use herein. Alkyl portions of the polymer chain can be substituted with, for example, halogens, $C_1$–$C_8$ alkoxy groups or $C_1$–$C_8$ alkyl side chains and can contain divalent heteroatomic groups (such as —O—, —Si—, —S— or —$SO_2$— ) in the paraffinic segment of the chain. The chain can also contain unsaturation and $C_6$–$C_{10}$ non-aromatic rings. Aromatic rings can contain substituents such as halogens, $C_1$–$C_8$ alkoxy or $C_1$–$C_8$ alkyl groups, and can be joined to the polymer backbone in any ring position and directly to the alcohol or acid functionality or to intervening atoms.

Typical aliphatic diols used in ester formation are the $C_2$–$C_{10}$ primary and secondary glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletherdicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethylol together with ethylene glycol in esterification with terephthalic acid forms a clear, amorphous copolyester ("PETG") of particular interest. Also contemplated are PCTG; liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters, those prepared from an aromatic diacid, such as the poly(alkylene arylenedicarboxylates) polyethylene terephthalate and polybutylene terephthalate, or mixtures thereof, are particularly useful in this invention. A polyester suitable for use herein may have an intrinsic viscosity of about 0.4 to 1.04, although values outside this range are permitted as well.

Methods and materials useful for the production of polyesters, as described above, are discussed in greater detail in Whinfield, U.S. Pat. No. 2,465,319, Pengilly, U.S. Pat. No. 3,047,539, Schwarz, U.S. Pat. No. 3,374,402, Russell, U.S. Pat. No. 3,756,986 and East, U.S. Pat. No. 4,393,191, each of which is incorporated herein by reference.

Component (e)(vi) is an ethylene/carbon monoxide copolymer, or an ethylene/carbon monoxide copolymer to which one or more ethylenically unsaturated monomers have been graft polymerized, suitable varities of which are described in Laughner, U.S. Pat. No. 4,929,673, which is incorporated herein by reference.

Component (e)(vii) is a poly(phenylene ether) [also known as a poly(phenylene oxide)]which is a polymer comprising a plurality of repeating structural units described generally by the formula

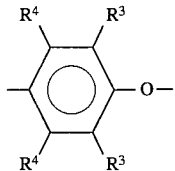

In each of said units, independently, each $R^3$ is independently hydrogen, halogen, primary or secondary $C_1$–$C_8$ alkyl, phenyl, haloalkyl, aminoalkyl, hydrocarbonoxy, or halohydrocarbonoxy wherein at least two carbon atoms separate the halogen and oxygen atoms; and each $R^4$ is independently hydrogen, halogen, primary or secondary $C_1$–$C_8$ alkyl, phenyl, haloalkyl, hydrocarbonoxy or halohydrocarbonoxy as defined for $R^3$. Examples of suitable primary alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary alkyl groups are isopropyl, sec-butyl and 3-pentyl. It is preferred that any alkyl radicals are straight chain rather than branched. Most often, each $R^3$ is alkyl or phenyl, especially $C_1$–$C_4$ alkyl, and each $R^4$ is hydrogen.

Both homopolymer and copolymer poly(phenylene ether)s are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units.

Also included are poly(phenylene ether)s containing moieties which modify properties such as molecular weight, melt viscosity and/or impact strength. Such polymers may be prepared by copolymerizing with or grafting onto the poly(phenylene ether), in known manner, such ethylenically unsaturated monomers as vinyl nitrile compounds (e.g. acrylonitrile) and vinyl aromatic, or styrenic, compounds (e.g., styrene), or such polymers as polystyrenes and elastomers. The product typically contains both grafted and ungrafted moieties. Other suitable polymers are the coupled poly(phenylene ether)s in which the coupling agent is reacted, in known manner, with the hydroxy groups of two poly(phenylene ether) chains to produce a higher molecular weight polymer containing the reaction product of the hydroxy groups and the coupling agent. Illustrative coupling agents are low molecular weight polycarbonates, quinones, heterocycles, formals and poly(phenylene sulfide)s. For example, poly(phenylene ether)/polycarbonate copolymers are known and are described in U.S. Pat. No. 5,010,143, which is incorporated herein.

The poly(phenylene ether) typically has a number average molecular weight within the range of about 3,000 to 40,000, and a weight average molecular weight within the range of about 20,000 to 80,000, as determined by gel permeation chromatography. Its intrinsic viscosity is typically in the range of about 0.15–0.6, and preferably at least 0.25, dL/g, as measured in chloroform at 25° C. However, values outside these ranges are permitted as well.

The poly(phenylene ether)s are typically prepared by the oxidative coupling of at least one corresponding monohydroxyaromatic compound. Particularly useful and readily available monohydroxyaromatic compounds are 2,6-xylenol (wherein each $R^3$ is methyl and each $R^4$ is hydrogen), whereupon the polymer may be characterized as a poly(2,6-dimethyl-1,4-phenylene ether), and 2,3,6-trimethylphenol (wherein each $R^3$ and one $R^4$ is methyl and the other $R^4$ is hydrogen). A variety of catalyst systems are known for the preparation of poly(phenylene ether)s by oxidative coupling. For the most part, they contain at least one heavy metal compound such as a copper, manganese or cobalt compound, usually in combination with various other materials such as an amine or an alkoxide. Poly(phenylene ether)s, as described above, are discussed in greater detail in U.S. Pat. No. 4,866,130, which is incorporated herein.

A poly(phenylene ether) is often blended with component (e)(viii), polystyrene, a styrenic copolymer [as described above with relation to component (c)], and/or with a polystyrene or styrenic copolymer which has been rubber modified by being blended or grafted with a polymer formed from diene and/or olefin monomers. Such a blend is typically made up of about 20 to about 99 parts, preferably about 30 to 90 parts, poly(phenylene ether) by weight, with the balance being made up of the polystyrene or styrenic copolymer, as mentioned. The rubber-modified polystyrene or styrenic copolymer is typically about 70 to 98 weight percent styrene or styrenic copolymer and about 2 to 30 weight percent blended or grafted polymer prepared from diene and/or olefin monomer, and is often referred to as high impact polystyrene ("HIPS").

Component (c)(ix) in the compositions of this invention is a polyurethane, suitable varities of which are described in the commonly assigned, concurrently filed U.S. application bearing attorney's docket number C-40,431, which is incorporated herein.

Component (c)(x) is poly(vinyl chloride) ("PVC"). PVC can be prepared by suspension polymerization at about 50°–75° C. in a batch process in which vinyl chloride monomer, $CH_2=CHCl$, ("VCM") is dispersed in water in a stirred reactor. A free radical initiator which is soluble in the VCM, such as an azo or peroxide initiator, is used. In the suspension process, VCM can further be copolymerized with other vinyl monomers, such vinyl acetate, acrylonitrile, butadiene, butyl acrylate, maleic anhydride, an olefin or styrene, to produce a random, block or graft copolymer.

PVC can also be prepared in a bulk or mass system in which VCM and a monomer-soluble initiator, such as acetyl cyclohexane sulfonyl peroxide, are stirred in the absence of water at about 62°–75° C. Methods such as the foregoing for the preparation of PVC are discussed in more detail in *Handbook of Polymer Synthesis*, Part A, Kricheldorf, Ed., Marcel Dekker, Inc., 1992, pages 172–182, which pages are incorporated herein.

The chlorine content of PVC is typically about 56.7 percent by weight. The weight average molecular weight of PVC is typically about 50,000 to 150,000, is preferably about 75,000 to 125,000, and is more preferably about 85,000 to 115,000. The solution viscosity of PVC, when measured as a 0.20 concentration in cyclohexanone at 30° C., may be about 0.5 to 1.1, and preferably about 0.89 to 0.93, centipoises.

A variety of additives may be advantageously employed to promote flame retardance or ignition resistance in the compositions of this invention. Representative examples thereof include the oxides and halides of the metals of Groups IVA and VA of the periodic table such as the oxides and halides of antimony, bismuth, arsenic, tin and lead such as antimony oxide, antimony chloride, antimony oxychloride, stannic oxide, stannic chloride and arsenous oxide; the organic and inorganic compounds of phosphorous, nitrogen, boron and sulfur such as aromatic phosphates and phosphonates (including halogenated derivatives thereof), alkyl acid phosphates, tributoxyethyl phosphate, 1,3-dichloro-2-propanol phosphate, 3,9-tribromoncopentoxy- 2,4,8,10-tetraoxa-3,9-diphosphaspiro-(5.5)undecane-3,9-dioxide, phosphine oxides, ammonium phosphate, zinc borate, thiourea, urea, ammonium sulfamate, ammonium polyphosphoric acid and stannic sulfide; the oxides, halides and hydrates of other metals such as titanium, vanadium, chromium and magnesium such as titanium dioxide, chromic bromide, zirconium oxide, ammonium molybdate and stannous oxide hydrate; antimony compounds such as antimony phosphate, sodium antimonate, $KSb(OH)_6$, $NH_4SbF_6$ and $SbS_3$; antimonic esters of inorganic acids, cyclic alkyl antimonite esters and aryl antimonic acid compounds such as potassium antimony tartrate, the antimony salt of caproic acid, $Sb(OCH_2CH_3)$, $Sb[OCH(CH_3)CH_2CH_3]_3$, antimony polyethylene glycorate, pentaerythritol antimonite and triphenyl antimony; boric acid; alumina trihydrate; ammonium fluoroborate; molybdenum oxide; halogenated hydrocarbons such as hexabromocyclodecane; decabromomdiphenyl oxide; 1,2-bis(2,4,6-tribromophenoxy)ethane; halogenated carbonate oligomers such as those prepared from Tetrabromobisphenol-A; halogenated epoxy resins such as brominated glycidyl ethers; tetrabromo phthalic anhydride; fluorinated olefin polymers or copolymers such as poly(tetrafluoroethylene); octabromodiphenyl oxide; ammonium bromide; isopropyl di(4-amino benzoyl)isostearoyl titanate; and metal salts of aromatic sulfur compounds such as sulfates, bisulfates, sulfonates, sulfonamides and sulfimides; other alkali metal and alkaline earth metal salts of sulfur, phosphorus and nitrogen compounds; and others as set forth in Laughner, U.S. Pat. No. 4,786,686, which is incorporated herein; and the like, and mixtures thereof. A preferred flame retardant additive is antimony trioxide ($Sb_2O_3$). When a flame retardant is used in the compositions of this invention, it is typically used in an amount of up to about 15 percent, advantageously from about 0.01 to 15 percent, preferably from about 0.1 to 10 percent and more preferably from about 0.5 to 5 percent, by weight of the total composition.

A variety of additives may be advantageously used in the compositions of this invention for other purposes such as the following: antimicrobial agents such as organometallics, isothiazolones, organosulfurs and mercaptans; antioxidants such as phenolics, secondary amines, phophites and thioesters; antistatic agents such as quaternary ammonium compounds, amines, and ethoxylated, propoxylated or glycerol compounds; fillers and reinforcing agents such as talc, clay, mica, silica, quartz, kaolin, aluminum nitride, $TiO_2$, calcium sulfate, $B_2O_3$, alumina, glass flakes, beads, whiskers or filaments, nickel powder and metal or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers such as a hindered amine, an o-hydroxy-phenylbenzotriazole, a 2-hydroxy,4-alkoxybenzophenone, a salicylate, a cyanoacrylate, a nickel chelate and a benzylidene malonate and oxalanilide. A preferred hindered phenolic antioxidant is Irganox™ 1076 antioxidant, available from Ciba-Geigy Corp. Such additives, if used, typically do not exceed 45 percent by weight of the total composition, and are advantageously from about 0.001 to 15 percent, preferably from about 0.01 to 10 percent and more preferably from about 0.1 to 10 percent, by weight of the total composition.

An acid acceptor or scavenger may be advantageously used in the compositions of this invention to enhance thermal stability in view of the tendency of CPE to liberate HCl when heated. Suitable acid acceptors are barium phosphate, epoxidized soybean oil and calcium stearate. When an acid acceptor is used in the compositions of this invention, it is typically used in an amount of up to about 10 percent, advantageously from about 0.001 to 10 percent, preferably from about 0.01 to 5 percent and more preferably from about 0.01 to 1 percent, by weight of the total composition.

To illustrate the practice of this invention, examples of several preferred embodiments are set forth below. It is not intended, however, that these examples should in any manner restrict the scope of this invention.

EXAMPLES 1–2

The compositions of Examples 1 and 2 are prepared by mixing polycarbonate with epoxidized soybean oil in a Lightnin blender for 30 seconds. To this is added CPE, barium phosphate and Irganox™ 1076 antioxidant. The resulting mixture is blended for another 30 seconds without the internal blade and again for 30 seconds with the blade. This final dry-blended formulation is passed through a 30 mm Werner-Pfleiderer twin-screw extruder, with all barrel zones at 190° C., and pelletized. The extruded pellets are dried in an air draft oven for at least 3 hours at 90° C. The dried pellets are then molded into bars (⅛"×½"×5") and plaques (⅛"×2½"×6½") on a 55 ton Negri Bossi molding machine, with a 220° C. barrel temperature on all zones, for testing.

The formulations of Examples 1 and 2 both contain 52.6 weight percent 80 melt flow rate Bisphenol-A polycarbonate, 0.5 weight percent epoxidized soybean oil, 1.8 weight percent barium phosphate and 0.1 weight percent Irganox™ 1076 antioxidant. Example 1 contains 45 weight percent chlorinated polyethylene containing 42 weight percent chlorine. Example 2 contains 45 weight percent graft copolymer prepared from 85 weight percent chlorinated polyethylene (containing 42 weight percent chlorine) to which methyl methacrylate is graft polymerized such that the methyl methacrylate constitutes 15 weight percent of the graft copolymer.

The following tests are performed on Examples 1 and 2. Impact resistance is measured by the Izod test according to ASTM Designation D 256-84 (Method A) at 73° F. The notch is 10 mils (0.254 mm) in radius. Izod results are reported in ft-lb/in.

"H.D.T.U.L." is heat deflection temperature under load as measured in accordance with ASTM Designation D 648-82 at 264 psi.

Flexural modulus is measured in accordance with ASTM Designation D 790-84a. Results are reported in kpsi.

Tensile strength at break is both measured in accordance with ASTM Designation D 638-84. Results are reported in kpsi.

Molecular weight change is the decrease in the weight average molecular weight (as determined by gel permeation chromatography) of the polycarbonate caused by the molding operation, and is determined by subtracting the molecular weight of the polycarbonate in the molded bars from that in the pellets before molding.

Specular gloss is measured according to ASTM Designation D 523-85 using a Dr. Bruno Lange Reflectometer RB. The beam axis angle is 20°.

Paintability is determined by the distinctness of image ("D.O.I.") test (ASTM E430-78, which measures the sharpness of an image reflected from a painted or coated glossly surface by goniophotometry; the crosshatch adhesion test (ASTM D3359-87B), which measures the adhesion to surface of paint which has been scored; and the dime rub test (General Motors 9506-P), an abrasion test which measures the durability of a coat of paint.

The testing results for Examples 1 and 2 are shown in Table II.

TABLE II

|  | Example 1 | Example 2 |
| --- | --- | --- |
| Izod | 12 | 15 |
| H.D.T.U.L., °F. | 214 | 217 |
| Flexural modulus | 148 | 152 |
| Tensile strength | 5,723 | 6,307 |
| Molecular weight change | 2,000 | 1,200 |
| 20° Gloss | 90 | 91 |
| D.O.I. | 95 | 95 |
| Crosshatch adhesion | #5 | #5 |
| Dime rub | Pass | Pass |

These results show that a polycarbonate/CPE blend is a useful molding composition. Stabilizers such as an acid scavenger, such as barium phosphate, and a phenolic antioxidant are preferred so that CPE can be melt processed at a temperature at which it might otherwise degrade. This is indicated by the good mechanical properties, the paintability and the quality of paint adhesion displayed by the bars and plaques molded from the compositions of Examples 1 and 2. Particularly desirable properties are displayed by Example 2, in which methyl methacrylate is graft polymerized to CPE.

EXAMPLES 3–5

The compositions of Examples 3–5 are prepared by mixing polycarbonate, CPE and SAN or ABS in a Lightnin blender for 30 seconds with agitation. Epoxidized soybean oil is added and the blender is run for an additional 30 seconds with agitation. Barium phosphate, Irganox™ 1076 antioxidant, $Sb_2O_3$ and, in some formulations, PTFE are then added, and the resulting mixture is blended for another 30 seconds without agitation and again for 30 seconds with agitation. This final dry-blended formulation is passed through a 30 mm Werner-Pfleiderer twin-screw extruder, with all barrel zones at 190° C., and pelletized. The extruded pellets are dried in an air draft oven for at least 3 hours at 90° C. The dried pellets are then molded into bars for testing (0.318 cm×1.27 cm×1.27 cm) and (0.157 cm×1.27 cm×1.27 cm) on a 55 ton Negri Bossi molding machine with a 225° C. barrel temperature on all zones.

The formulations in weight percent for Examples 3–5 are shown in Table III. In Table III, "PC" is 80 melt flow rate Bisphenol-A polycarbonate, "CPE I" is chlorinated polyethylene prepared with water washing and no deblocking agent, "CPE II" is chlorinated polyethylene containing 40.8 weight percent chlorine, "CPE III" is chlorinated polyethylene to which methyl methacrylate is graft polymerized, "ABS I" is acrylonitrile/butadiene/styrene copolymer containing 11 weight percent butadiene and 15 weight percent acrylonitrile, "ABS II" is acrylonitrile/butadiene/styrene copolymer containing 16 weight percent butadiene and 23 weight percent acrylonitrile, "PTFE" is poly(tetrafluoroethylene), "E.S.O." is epoxidized soybean oil, and "I-1076" is Irganox™ 1076 antioxidant.

In addition to testing for Izod and flexural modulus, as described above in relation to Examples 1 and 2, the U.L.

(Underwriters Laboratory) 94 burn test is performed on Examples 3–5. The Izod test is conducted at room temperature (23°–25° C.). Izod is reported in ft-lbs, and flexural modulus is reported in kpsi. Results are reported in Table III.

|  | Example 3 | Example 4 | Example 5 |
|---|---|---|---|
| PC | 44.9 | 44.4 | 87.1 |
| CPE I | 20.0 | | |
| CPE II | | 20.0 | |
| CPE III | | | 10.0 |
| ABS I | 30.0 | | |
| ABS II | | 30.0 | |
| $Sb_2O_3$ | 4.0 | 4.0 | 2.0 |
| PTFE | | 0.5 | 0.3 |
| Barium phosphate | 0.8 | 0.8 | 0.4 |
| E.S.O. | 0.2 | 0.2 | 0.1 |
| I-1076 | 0.1 | 0.1 | 0.1 |
| Izod | 7.2 | 9.4 | 13.0 |
| Flexural modulus | 211 | 263 | 259 |
| U.L.-94, 1/16th inch | Fail | V-0 | V-0 |

These results show, as do those for Examples 1–2, that a polycarbonate/CPE blend is a useful molding composition which has mechanical properties in a desirable range. A composition such as that in Example is particularly desirable because, when an ABS with a higher acrylonitrile content is used, a higher flexural modulus is obtained. Good mechanical properties are also obtained even in the absence of ABS where the CPE is grafted with methyl methacrylate, such as in Example 5. The use of $Sb_2O_3$ together with PTFE imparts a V-0 rating to the composition, as shown by Examples 4–5.

EXAMPLE 6

Example 6 is prepared by premixing 6 weight percent of a chlorinated polyethylene which contains 36 weight percent chlorine, 7 weight percent of a brominted epoxy resin (QUATREX® 6410 epoxy resin from The Dow Chemical Company), 3 weight percent $Sb_2O_3$, and 0.3 weight percent barium phosphate. The premixed material is added to 45 weight percent 14 MFR Bisphenol-A polycarbonate and 38.7 weight percent ABS. All these components are dry blended in a Lightnin blender for 30 seconds without the internal agitator and for 30 seconds with the internal agitator. This final dry-blended formulation is passed through a 30 mm Werner-Pfleiderer twin-screw extruder, with all barrel zones at 250° C., and pelletized. The extruded pellets are dried in an air draft oven for at least 3 hours at 90° C. The dried pellets are then molded on a 70-ton Arburg molding machine, using a 230° C. barrel temperature, into bars (⅛"×½"×5") and (1/16"×½"×5") for testing. When subjected to the U.L.-94 burn test, the composition of Example 6 rates both V-0 at 1/16" and 5 V at ⅛", which demonstrates that a polycarbonate/CPE composition having desirable flame properties can be prepared without the use of PTFE.

What is claimed is:

1. A composition of matter comprising, in admixture, polycarbonate, chlorinated polyethylene to which an ethylenically unsaturated monomer is not graft polymerized, an epoxy resin, a styrenic copolymer and an antimony compound.

2. The composition of claim 1 wherein the epoxy resin is described by the formula

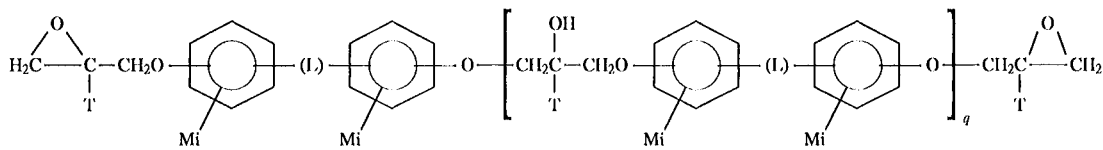

where each T can independently be hydrogen or an aliphatic hydrocarbyl group having from 1 to about 3 carbon atoms; each M is independently chlorine or bromine; each i is independently 1 or 2; each L is independently a divalent hydrocarbyl group having from 1 to about 12 carbon atoms; and q can be any value from 0 to 20 (not necessarily an integer).

3. The composition of claim 1 further comprising polyester.

4. The composition of claim 1 further comprising poly(vinyl chloride).

5. The composition of claim 1 wherein the styrenic copolymer is selected from a vinyl aromatic/vinyl nitrile copolymer and a rubber-modified vinyl aromatic/vinyl nitrile copolymer.

6. The composition of claim 5 wherein the rubber-modifier in the rubber-modified vinyl aromatic/vinyl nitrile copolymer is polymerized from a diene, an olefin monomer, an alkyl acrylate or methacrylate, a vinyl aromatic compound or a vinyl nitrile compound or a mixture thereof.

7. The composition of claim 1 wherein the styrenic copolymer is a vinyl aromatic/vinyl nitrile copolymer which contains at least 35 percent vinyl nitrile compound by weight.

8. The composition of claim 7 wherein the vinyl aromatic/vinyl nitrile copolymer is rubber-modified.

9. The composition of claim 8 wherein the rubber-modifier in the rubber-modified vinyl aromatic/vinyl nitrile copolymer is polymerized from a diene, an olefin monomer, an alkyl acrylate or methacrylate, a vinyl aromatic compound or a vinyl nitrile compound, or a mixture thereof.

10. The composition of claim 1 further comprising chlorinated polyethylene to which an ethylenically unsaturated monomer is graft polymerized.

11. The composition of claim 10 wherein the ethylenically unsaturated monomer is selected from one or more members of the group consisting of an alkyl ester of an unsaturated carboxylic acid, a vinyl aromatic compound, a vinyl ester and a vinyl nitrile compound.

12. The composition of claim 10 wherein the ethylenically unsaturated monomer is selected from one or more members of the group consisting of methyl methacrylate, styrene, vinyl acetate and acrylonitrile.

13. The composition of claim 1 further comprising an elastomeric impact modifier.

14. The composition of claim 1 wherein the antimony compound is an antimony oxide.

15. The composition of claim 1 further comprising a fluorinated olefin polymer or copolymer.

16. The composition of claim 1 which has a V-0 rating in the U.L.-94 burn test.

17. The composition of claim 1 which has a 5 V rating in the U.L.-94 burn test.

18. The composition of claim 1 further comprising an acid acceptor.

19. The composition of claim 1 in the form of a molded or extruded article.

* * * * *